Feb. 14, 1967 C. T. LINK, JR., ETAL Re. 26,155

STREET SWEEPER DIRT BOX ASSEMBLY

Original Filed Sept. 24, 1954 3 Sheets-Sheet 1

Inventors

CHARLES T. LINK, JR.
ROBERT F. SCHMIDT
JOHN S. GOODEN

Hill, Sherman, Meroni, Gross & Simpson by Attys.

STREET SWEEPER DIRT BOX ASSEMBLY

Original Filed Sept. 24, 1954 3 Sheets-Sheet 2

Inventor
CHARLES T. LINK, JR.
ROBERT F. SCHMIDT
JOHN S. GOODEN
By Hill, Sherman, Meroni, Gross & Simpson Attys.

STREET SWEEPER DIRT BOX ASSEMBLY
Original Filed Sept. 24, 1954 3 Sheets-Sheet 3
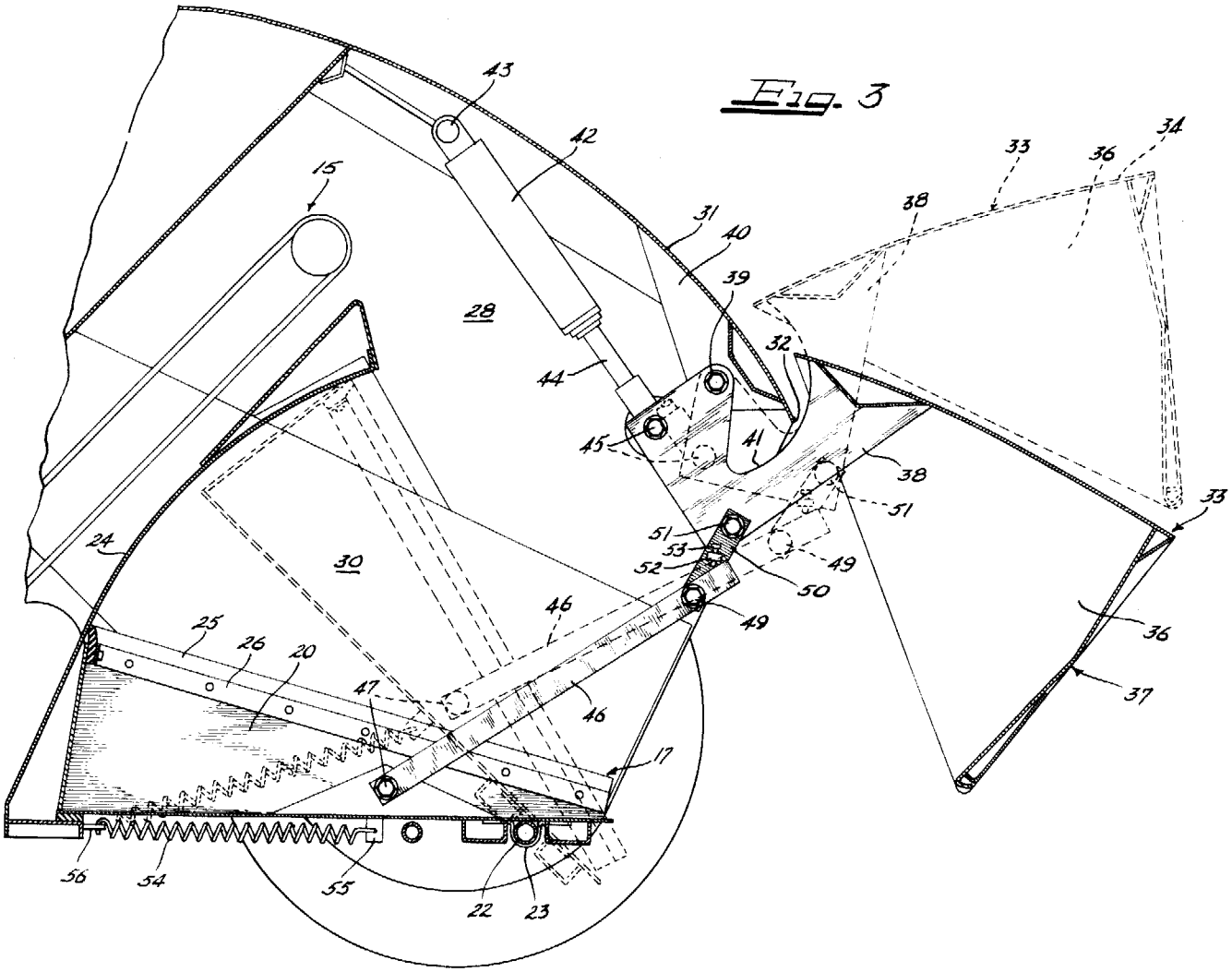
Inventor
CHARLES T. LINK, JR.
ROBERT F. SCHMIDT
JOHN S. GOODEN
by Hill, Sherman, Meroni, Gross & Simpson
Attys.

United States Patent Office

Re. 26,155
Reissued Feb. 14, 1967

26,155
STREET SWEEPER DIRT BOX ASSEMBLY

Charles T. Link, Jr., Skokie, Robert F. Schmidt, Elgin, and John S. Gooden, Chicago, Ill., by Elgin Sweeper Company, Elgin, Ill., a corporation of Delaware Original No. 2,828,037, dated Mar. 25, 1958, Ser. No. 458,176, Sept. 24, 1954. Application for reissue July 13, 1965, Ser. No. 475,039
5 Claims. (Cl. 214—508)

Matter enclosed in heavy brackets [ ] appears in the original patent but forms no part of this reissue specification; matter printed in italics indicates the additions made by reissue.

This invention relates to a street sweeper dirt box assembly, and more particularly to a readily constructed and operated, efficient reliable dirt box assembly arranged to provide maximum dirt storage capacity within the minimum over-all size of the street sweeper.

In the dirt box assembly of this invention, a dirt box may have a floor arranged to receive and support dirt and may also have a pair of side walls and at least one end wall to prevent flow of the dirt off of the floor. The dirt box may normally be in a position with the floor in a generally horizontal dirt-receiving position but is arranged to be tilted to a position to discharge the dirt therefrom.

The dirt box may receive dirt directly from a street sweeper broom, but, most preferably, the sweeper has an upwardly inclined conveyor for receiving dirt from the broom and conveying the dirt upwardly to discharge the dirt down onto the dirt box floor which is disposed in underlying relation to an upper portion of the conveyor.

According to a specific feature of the invention, the dirt box has one end portion in relatively closely spaced relation to the lower end of the conveyor with the opposite end portion thereof projecting beyond a point in vertical alignment with the upper end of the conveyor so as to make maximum use of the space below the conveyor within the street sweeper.

The dirt box is tiltable to discharge dirt from the end thereof spaced furthest from the lower end of the conveyor, most preferably about an axis adjacent such end. According to a specific feature of the invention, a baffle plate may be provided for engaging the end of the dirt box closest to the conveyor during tilting movement of the dirt box, the baffle plate being disposed in an arc about the axis of tilting movement of the dirt box in relatively closely spaced relation to the underside of the upwardly inclined conveyor. It will be appreciated that with this construction, the space in the street sweeper is utilized to a maximum advantage for the accumulation of dirt.

According to a further feature of the invention, the street sweeper comprises a housing having an opening therein with a door, preferably hinged, being provided for closing the opening, the dirt box being disposed within the housing and being arranged to discharge out such opening when the door is opened.

According to a specific feature of the invention, means are provided connecting the door to the dirt box whereby the dirt box automatically discharges out through the opening when the door is opened. Such means connecting the dirt box to the door may most preferably be arranged to actuate the dirt box only after the door is opened to a predetermined extent.

The door may be manually actuated but, most preferably, fluid actuated means are provided for actuating the door, the dirt box being actuated from the door through the above-referred connection means between the dirt box and the door.

According to still another feature of the invention, the door carries floor means forming a continuation of the dirt box floor so that an auxiliary or second dirt box is provided. The door may be tiltable away from the dirt box to discharge from the floor means carried thereby, with the dirt box being thereafter tiltable to discharge dirt from the floor thereof through the space initially occupied by the floor means carried by the door. It will be appreciated that this construction provides a pair of dirt boxes with the dirt box defined by the door discharging first and the main dirt box being thereafter actuated to a discharge position.

A still further specific feature resides in the connection means between the door and the main dirt box by which the door is opened to a predetermined extent before the dirt box is actuated, the dirt box being actuated only with further opening movement of the door. Although any known type of lost-motion connection might suffice as a connection between the door and the dirt box, the connection, according to this invention, comprises a pair of pivotally connected links with adjustable means for limiting relative pivotal movement of the links. More specifically, the connection may comprise a first link pivoted on a first axis to the dirt box, a second link pivoted to the first link on a second axis and pivoted to the door on a third axis with such second axis being normally disposed a substantial distance from a line through the first and third axes, adjustable means being provided for limiting movement of such second axis toward such line. Preferably, such adjustable means may comprise a screw threaded on one of the links and engageable with the other of the links.

It will be apparent that this invention provides a readily constructed and operated, efficient and reliable dirt box assembly arranged to provide maximum dirt storage capacity with minimum overall size of the street sweeper.

It will further be apparent that the principles of this invention are not necessarily limited to street sweepers but may be applied to any machine or structure wherein it is desired to accumulate dirt, refuse, or any materials having similar characteristics, and the terms dirt and street sweeper are, therefore, used in a sense to include equivalent materials, machines, or structures.

An object of this invention, accordingly, is to provide a readily constructed and operated, efficient and reliable dirt box assembly arranged to provide maximum dirt storage capacity with minimum overall size of the street sweeper.

A further object of this invention is to provide an improved dirt box assembly including a door arranged for closing and opening in the housing of a street sweeper where the dirt box in the housing is arranged to discharge out such opening when the door is opened.

Another object of this invention is to provide an improved dirt box assembly in which connections means are provided between a door and a dirt box to actuate the dirt box after the door is opened to a predetermined extent.

A still further object of this invention is to provide an improved dirt box assembly in which a door is formed with four means forming a continuation of a dirt box floor, to thus provide a pair of dirt boxes.

Still another object of this invention is to provide improved connection means between tiltable dirt box structures or the like.

This invention contemplates other objects, features and advantages which will become more fully apparent from the following detailed description taken in conjunction with the accompanying drawings which illustrate a preferred embodiment and in which:

FIGURE 3 is a view similar to FIGURE 2 but illustrating the parts in an intermediate actuated condition.

Figure 1:
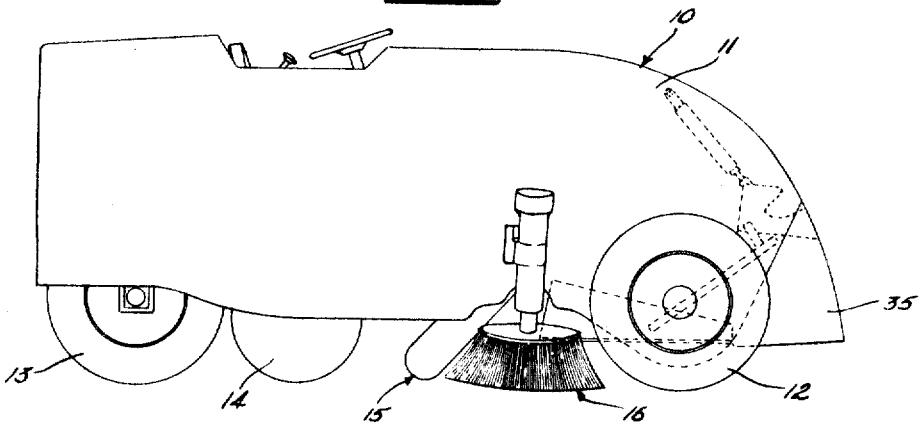
FIGURE 1 is a side elevational view of a street sweeper machine utilizing a dirt box assembly constructed in accordance with the principles of this invention.
Figure 4:
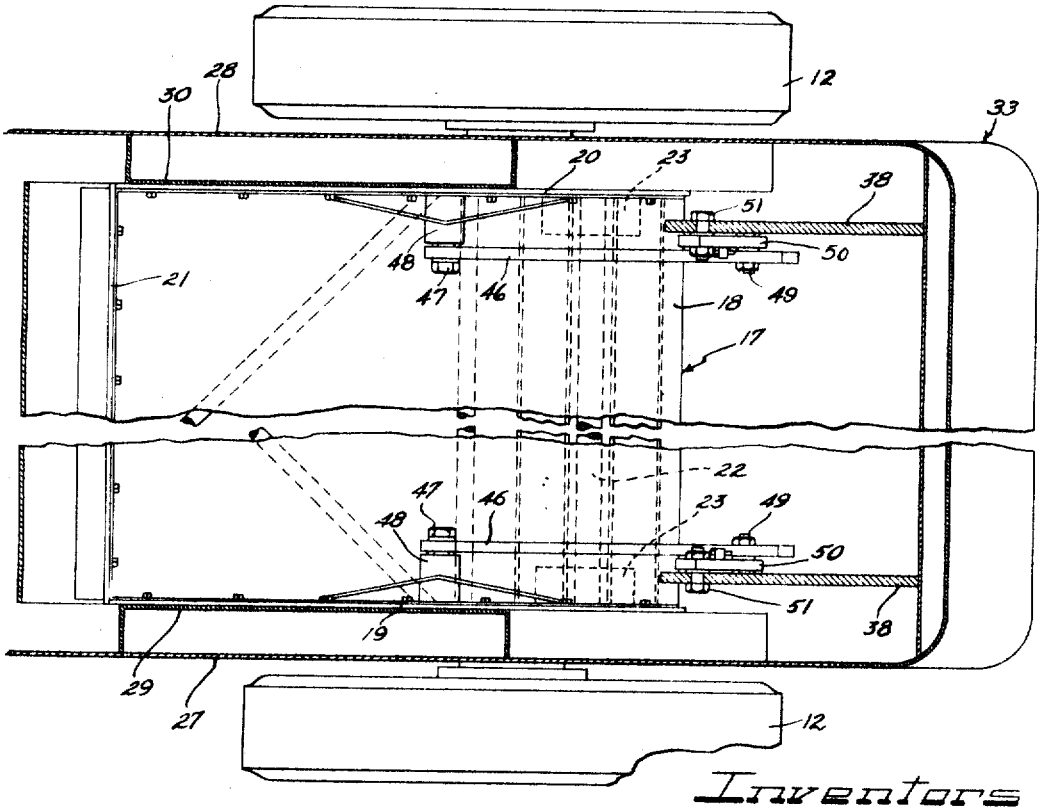
FIGURE 4 is a sectional view taken substantially along lines IV—IV of FIGURE 2.

Reference numeral 10 generally designates a street sweeper incorporating a dirt box assembly constructed according to the principles of this invention which may comprise a housing 11 supported on a pair of front wheels 12 and a single steerable rear wheel 13, a main broom 14 which is rotated to throw dirt or refuse onto the lower end portion of an upwardly inclined conveyor 15 and a side broom 16 arranged to engage in the street gutter and throw refuse or dirt into the path of the main broom 14.

The conveyor 15 may be inclined forwardly and the dirt box assembly of this invention may be located at the forward end of the sweeper 10 to receive dirt from the conveyor 15 and accumulate or store dirt until a convenient point for discharge of the dirt is reached, whereupon the dirt box assembly may be actuated to discharge the dirt.

According to this invention, the dirt box assembly may comprise a main dirt box generally designated by reference numeral 17 which may comprise a floor 18 normally disposed in a generally horizontal position to receive dirt from the upper end of the conveyor 15, a pair of side walls 19 and 20 and a rearward end wall 21 for preventing flow of dirt off of the dirt box floor 18.

It will be noted that the rearward end of the dirt box 17 is deposited in relatively closely spaced relation to the lower end portion of the conveyor and that the dirt box 17 is in underlying relation to the upper end portion of the conveyor 15. With this arrangement, the space within the housing 11 of the street sweeper 10 is utilized to maximum advantage for dirt storage.

Figure 2:
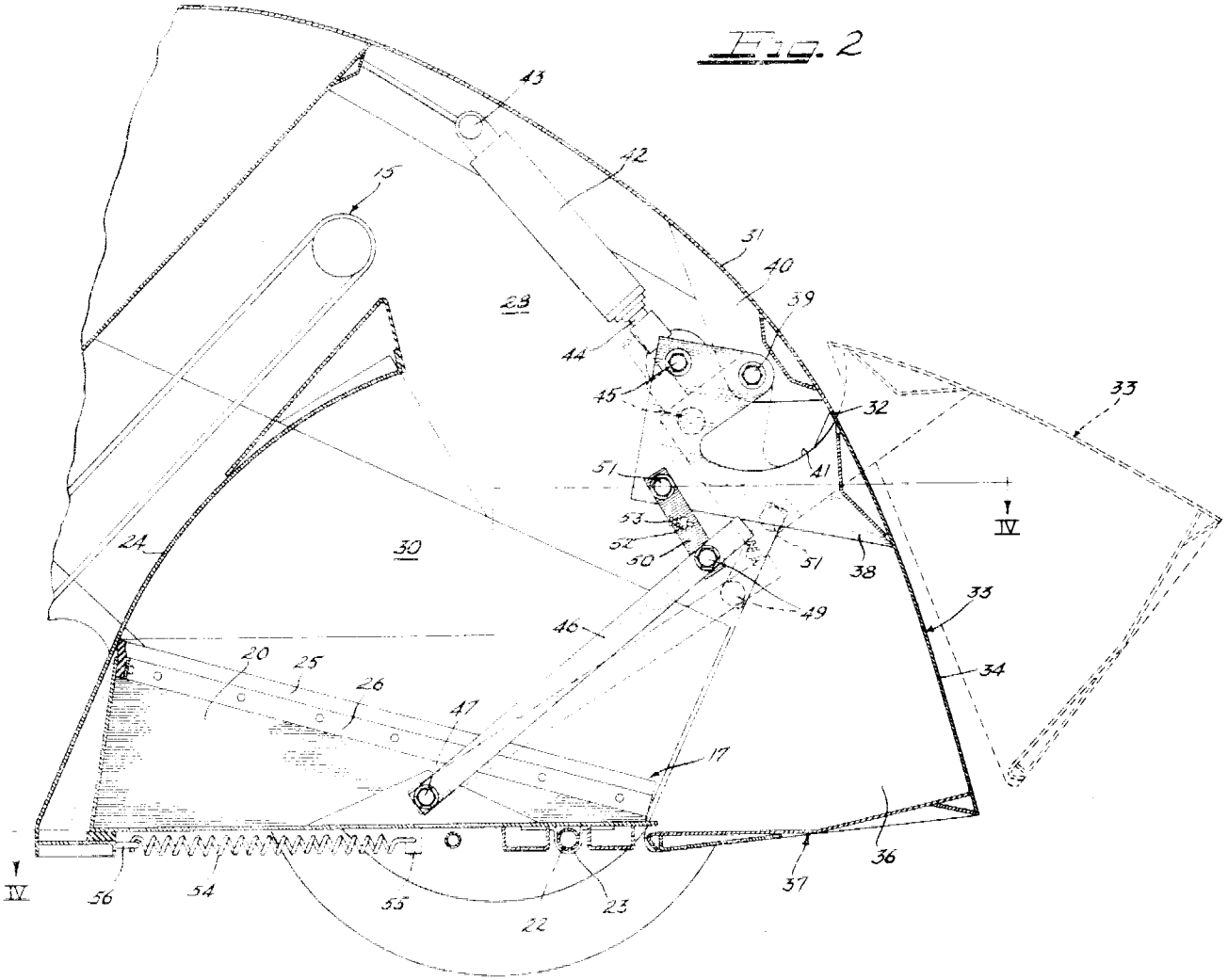
FIGURE 2 is a sectional elevational view through a forward portion of the street sweeper of FIGURE 1, illustrating the dirt box assembly in enlarged detail.

The dirt box 17 may be supported for tilting movement between a position as illustrated in full lines in FIGURES 2 and 3 and a position as illustrated in dotted lines in FIGURE 3 to discharge dirt therefrom, preferably about an axis adjacent the forward end thereof so that the dirt is discharged from such forward end. To provide this tiltable support, an axle 22 may be supported between the side walls of the housing 11 and the dirt box 17 may have a pair of brackets 23 secured to the underside of the floor 18 to pivotally secure the dirt box 17 on the axle 22.

According to a specific feature of the invention, a baffle plate 24 is provided for engaging the rearward end of the dirt box during tilting movement thereof, the baffle plate 24 being disposed generally in an arc about the axis of the axle 22 and being disposed in relatively closely spaced relation to the underside of the upper portion of the upwardly inclined conveyor 15. The baffle plate 24 is, of course, rigidly supported between the side walls of the housing 11 of the street sweeper 10.

To provide a seal between the dirt box 17 and the portions of the housing cooperating therewith, a strip 25 of flexible resilient material may extend around the upper edges of the side walls 19 and 20 and the rearward end wall 21 of the dirt box 17, the strip 25 being secured to the side and end walls by a strap 26 bolted to the side and end walls and clamping the strip 25 thereto, the strip 25 being urged by its own resilience into pressure contact with the side walls of the housing 11 and with the baffle plate 24 so as to provide a seal.

It should be noted that the side walls of the housing 11, to which reference numerals 27 and 28 are applied, carry plates 29 and 30 spaced inwardly therefrom on opposite sides of the dirt box 17 adjacent the sides 19 and 20, respectively, thereof to provide space for the journalling of the front wheels 12 of the sweeper 10. The plates 29 and 30 are, of course, engaged by the strip 25 of flexible resilient material to provide the seal between the dirt box 17 and the sides of the housing 11.

The housing 11 has a top wall 31 which is sloped downwardly at the forward end thereof and terminated at an edge 32 spaced upwardly from the plane of the dirt box floor 18 in its normal position. The side walls 27 and 28 of the housing 11 have forward edges extending between the ends of the edge 32 of the top 31 to points generally in alignment with the forward edge of the dirt box floor 18. There is thus provided an opening at the forward end of the housing 11.

This opening is arranged to be closed by means of a door generally designated by reference numeral 33 which comprises a forward wall 34 arranged to extend downwardly and slightly forwardly from the edge 32 of the top wall 31 of the housing 11 to form a continuation of the top wall 31, a pair of generally triangularly shaped side walls 35 and 36 arranged to form continuation of the side walls 27 and 28, respectively, of the housing 11, and floor means generally designated by reference numeral 37 arranged for disposition in a generally horizontal plane to form a continuation of the floor 18 of the main dirt box 17. The door 33 thus provides an additional dirt box.

The door 33 is supported for tilting movement away from the dirt box 17 out of closing relation to the opening in the forward end of the housing 11 to discharge dirt from floor means 37 and also to allow discharge of the dirt from the dirt box 17.

For this purpose, a pair of plates 38 are secured to and projected rearwardly from upper end portions of the wall 34 of the door 33 and are pivotally secured by means of pins 39 to a pair of plates 40 secured to and extending rearwardly and downwardly from the top wall 31 of the housing 11 above the edge 32 thereof. The plates 38 may preferably have recessed upper edge portions 41 concavely arcuate about the axis of pins 39 so that the axis of tilting movement of the door 33 is as high as possible and yet the plates 38 clear the edge 32 of the top 31.

The door 33 may preferably be power-actuated and, for this purpose, a pair of hydraulic cylinders 42 may be pivoted by means of pins 43 to the housing 11 with piston rods 44 projecting from the cylinders 42 being pivotally connected to the plates 38 by means of pins 45. By actuation of the cylinders 42, the piston rods 44 may be forced downwardly and forwardly to pivot the door 33 from the full line position of FIGURE 2 through the dotted line position of FIGURE 2 (the full line position of FIGURE 3) to the dotted line position of FIGURE 3. It may be noted that the cylinders 42 are in relatively closely spaced relation under the top 31 of the housing 11 so as to be out of the path of dirt discharged from the conveyor 15 and dirt accumulating in the dirt box assembly. It might also be noted that the plates 38, in addition to providing a pivotal support for the door 33, also serve as a means for connecting the door 33 to the pistons 44 of the hydraulic cylinders 42.

An important feature of the present invention resides in a connection between the door 33 and the dirt box 17 by which the dirt box 17 is actuated by outward movement of the door 33 but not until the door 33 is opened to a predetermined extent.

According to this feature, a pair of links 46 are pivotally secured by means of pins 47 to bosses 48 projecting inwardly from the sides 19 and 20 of the dirt box 17. The other ends of the links 46 are pivoted by means of pins 49 to links 50 which are, in turn, pivoted to the plates 38 by means of pins, or bolts, 51.

In the normal position of the door 33, as illustrated in full lines in FIGURE 2, the axis of the pins 49 is spaced a substantial distance forwardly from a line through the axes of the pins 47 and 51. With this arrangement, the door 33 may be tilted forwardly and upwardly a substantial distance before actuation of the dirt box 17, for example, to a position as illustrated in dotted lines in FIGURE 2, or as illustrated in full lines in FIGURE 3.

However, when this position is reached, means are provided limiting further movement of the pins 49 toward the lines between the axes of the pins 47 and 51 and with further outward movement of the door 33, the dirt box 17 will be tilted upwardly about the shaft 22 to a discharge position as illustrated in dotted lines in FIGURE 3.

For limiting relative pivotal movement between the links 46 and the links 50, the links 50 may have inwardly projecting bosses intermediate the pins 49 and 51 through which bolts 53 are threaded, the ends of the bolts being engageable with end portions of the links 46 to limit movement of the pins 49 toward a line between the axes of the pins 47 and 51. The point at which further movement is prevented may be adjusted, of course, by adjustment of the bolts 53.

It could happen that the dirt box 17 might be left in a position as illustrated in dotted lines in FIGURE 3 and that mud or the like might prevent the dirt box 17 from dropping to its normal position of FIGURE 2 under its own weight. To insure that the dirt box 17 will drop to its normal position of FIGURE 2, a coiled tension spring 54 is disposed under a central portion of the dirt box 17 and has one end secured to a bracket 55 secured to the underside of the dirt box floor 18 with its other end being secured to a bracket 56 fixedly supported from the housing of the sweeper.

It will be apparent, accordingly, that this invention provides a readily constructed and operated, efficient and reliable dirt box assembly which achieves maximum dirt storage capacity within a street sweeper housing of minimum overall size.

It will be understood that modifications and variations may be effected without departing from the spirit and scope of the novel concepts of the present invention.

We claim as our invention:

[1. In a street sweeper or the like, an upwardly inclined conveyor, a dirt box disposed in underlying relation to an upper portion of said conveyor and tiltable upwardly about an axis adjacent the end thereof spaced furtherest from the lower end of said conveyor, and a stationary baffle plate for engaging the other end of said dirt box during tilting movement thereof and disposed in an arc about said axis in relatively closely spaced relation to the underside of said upper portion of said conveyor.]

2. In a street sweeper, a housing, an upwardly inclined conveyor within said housing, a dirt box having a floor normally disposed in a horizontal plane below the upper end portion of said conveyor, means adjacent the end of said dirt box remote from said conveyor for supporting said dirt box for upward pivotal movement about a horizontal axis parallel to said conveyor with the other end of said dirt box being thereby moved in an arc adjacent the underside of the upper end portion of said conveyor, a door pivotal on said housing for movement about an axis parallel to said horizontal axis and spaced upwardly therefrom *enabling said door to be pivoted at its upper end in a direction away from the horizontal axis of the dirt box to create a door discharge opening through which the contents of the dirt box can be discharged, the dirt box being pivoted to a dumping position in response to the opening of the door,* said door including a generally vertical wall forming an end wall for the housing and a bottom wall forming a continuation of said dirt box floor, said door being pivoted outwardly and said dirt box being pivoted upwardly to discharge [dirt from said housing] *all of the dirt directly out of the door opening upon pivoting of the door to open position.*

3. A street sweeper according to claim 2 further including means acting between said door and said housing for pivoting said door outwardly, and a lost-in motion linkage between said door and said dirt box for pivoting said dirt box upwardly after said door has been moved outwardly to a certain extent.

4. A street sweeper according to claim 3 in which said linkage comprises a first link pivoted on a first axis to said dirt box, a second link pivoted to said first link on a second axis and pivoted to said door on a third axis, said second axis being normally disposed a substantial distance from a line through said first and third axes, and adjustable means for limiting movement of said second axis toward said line.

5. A street sweeper according to claim 4 in which said adjustable means comprises a screw threaded on one of said links and engageable with the other of said links.

6. In a street sweeper, a housing having side walls, an upwardly inclined conveyor within said housing, a dirt box having a floor normally disposed in a horizontal plane below the upper end of said conveyor, means adjacent the end of said dirt box remote from said conveyor for supporting said dirt box for upward pivotal movement about a horizontal axis parallel to said conveyor with the other end of said dirt box being thereby moved in an arc adjacent the underside of the upper end portion of said conveyor, and a door pivoted on said housing for movement about an axis parallel to said horizontal axis and spaced upwardly therefrom, said door including a generally vertical wall forming an end wall for the housing, a pair of side walls forming continuations of the side walls of said housing, and a bottom wall forming a continuation of said dirt box floor, said door being pivoted outwardly and said dirt box being pivoted upwardly to discharge dirt from said housing.

References Cited by the Examiner

The following references, cited by the Examiner, are of record in the patented file of this patent or the original patent.

UNITED STATES PATENTS

| | | |
|---|---|---|
| 866,628 | 9/1907 | Crowson. |
| 1,239,293 | 9/1917 | Murphy. |
| 1,338,369 | 4/1920 | Henderson. |
| 1,506,762 | 9/1924 | Manierre. |
| 1,887,465 | 11/1932 | Priestman. |
| 2,199,703 | 5/1940 | Hough |
| 2,213,385 | 9/1940 | Dailey. |
| 2,511,866 | 6/1950 | Mork. |
| 2,553,484 | 5/1951 | Stauch. |
| 2,609,622 | 9/1952 | Murray. |
| 2,614,279 | 10/1952 | Mott. |
| 2,669,043 | 2/1954 | Reischl. |
| 2,684,496 | 7/1954 | Lull. |
| 2,703,184 | 3/1955 | Barrett. |

FOREIGN PATENTS

| | | |
|---|---|---|
| 621,692 | 11/1935 | Germany. |
| 910,658 | 5/1954 | Germany. |
| 13,652 | 1893 | Great Britain. |

GERALD M. FORLENZA, *Primary Examiner.*

ALBERT J. MAKAY, *Examiner.*